United States Patent [19]
Thompson

[11] Patent Number: 5,846,462
[45] Date of Patent: Dec. 8, 1998

[54] METHOD AND APPARATUS FOR MAKING HIGH COMPRESSION STRUCTURAL FOAM

[76] Inventor: Edward J. Thompson, 706 Linkfield Rd., Watertown, Conn. 06795

[21] Appl. No.: 857,842

[22] Filed: May 16, 1997

[51] Int. Cl.[6] .......................... B29C 43/22; B29D 44/20; B29D 44/28
[52] U.S. Cl. .................... 264/51; 261/DIG. 26; 264/45.8; 264/DIG. 84; 428/71
[58] Field of Search .............. 252/307; 264/51, 264/DIG. 84, 45.8; 261/DIG. 26; 427/244; 428/71

[56] References Cited

U.S. PATENT DOCUMENTS

| | | |
|---|---|---|
| 2,774,106 | 12/1956 | Bethe ............................. 18/12 |
| 2,841,205 | 7/1958 | Bird .............................. 264/46.2 |
| 3,608,132 | 9/1971 | Nelson et al. ................. 18/1 FB |
| 3,655,311 | 4/1972 | Porter ........................... 425/115 |
| 3,706,516 | 12/1972 | Kisteneich et al. ............ 264/51 X |
| 3,719,734 | 3/1973 | Petzetakis ..................... 264/51 |
| 4,051,209 | 9/1977 | Tabler ........................... 264/51 X |
| 4,144,295 | 3/1979 | Dever, Jr. ...................... 264/51 X |
| 4,156,041 | 5/1979 | Gilbert .......................... 427/244 |
| 4,196,160 | 4/1980 | Sperry .......................... 264/51 X |
| 4,572,865 | 2/1986 | Gluck et al. .................. 428/309.9 |
| 4,648,922 | 3/1987 | Marks et al. ................... 156/79 |
| 4,749,533 | 6/1988 | Payne ............................ 264/45.5 |
| 4,956,133 | 9/1990 | Payne ............................ 264/39 |
| 5,089,190 | 2/1992 | Trevathan et al. ............. 264/45.9 |
| 5,429,840 | 7/1995 | Raterman et al. ............. 427/244 X |
| 5,569,420 | 10/1996 | Van Horne ................... 264/51 X |

*Primary Examiner*—Richard D. Lovering
*Attorney, Agent, or Firm*—Robert A. Seemann

[57] ABSTRACT

A structural foam billet made from a plurality of blobs of foam forming stock which are spaced from one another in a predetermined order and expanded into the structural foam billet.

13 Claims, 10 Drawing Sheets

DEFINITIONS

METHOD AND APPARATUS FOR MAKING HIGH COMPRESSION STRUCTURAL FOAM

BACKGROUND OF THE INVENTION

1. Field of the Invention

The invention pertains to plastic article shaping involving continuous molding of pore formable material, more specifically to making structural foam which includes insulation and packaging foam board, that has high compressive strength in the direction of the thickness of the board commonly called the Y direction, with low density and weight at relatively low cost.

2. Description of the Prior Art

Compressive strength that is parallel to the thickness of a structural foam panel used in the construction, insulation, refrigeration and transportation industries is usually the most important strength property of the panel. A foam panel used in roofing, for example, must be strong enough to walk on and take traffic during the construction phase without being damaged or destroyed.

Manufacturers of structural foam panels try to provide panels having high compressive strength while producing the panels from continuous high speed strip having low density to strength ratio, but this is difficult.

During production of foam panels in cool ambient temperature there is a tendency for panels to shrink in the Y direction, that is in thickness, when exposed to cold temperatures right after production. This is because the blowing agent used to expand the cells condenses in the cells from the lower temperature leaving a lower pressure inside the closed cells. Atmospheric pressure of 14.7 psi on the outside of the panel then compresses the cells causing permanent deformation in the under-cured panel. Deforming the cells reduces their height and lowers compressive strength in the Y direction. To cope with this problem manufacturers of polyurethane and polyisocyanurate panels usually increase the foam density and delay shipping until the foam has a chance to more fully cure. Increasing density or controlling ambient temperature is costly.

The compressive strength of plastic foam such as polyurethane foam is affected by the direction in which the foam rises. The maximum strength is parallel to the direction of rise, as will be discussed later.

The prior art is replete with manufacturing designs for providing high speed continuous production of structural foam with cell expansion that approach being perpendicular to the continuous movement of the carrier or belt upon which the foam forming stock is laid wherein the cells are as close to perfect spheres as possible or where their expansion in the Y direction is high, in order to provide high compressive strength in the Y direction.

U.S. Pat. No. 2,774,106 patented Dec. 18, 1956 by E. J. Bethe describes extruding latex foam on a moving wide belt with a fan shaped flat nozzle wherein every portion of the latex stream is under the same pressure as it leaves the discharge end of the nozzle so that the foam is deposited on the belt in uniform thickness and bubble size, to provide a sheet having uniform cell structure, thickness and density. The foam is created before it leaves the nozzle, and foam pressure drops to nearly atmospheric as it leaves the nozzle. As the foam passes through the extruding nozzle the surfaces of the foam that contact the smooth inner walls of the outwardly-flaring portion of the nozzle undergo an ironing action that imparts to the upper and lower face of the extruded sheet a smooth flat surface. The deposited sheet remains upon the advancing belt until it is gelled a desired amount and then passes through a heated chamber where it is vulcanized by the heat.

U.S. Pat. No. 3,608,132 patented Sep. 28, 1971 by D. C. Nelson et al., describes extruding a shaped stream of molten foamable polymeric material into ambient air where it expands and is quenched to below its second order phase transition temperature to a web of cells. The solid foam is then passed through a reduced pressure atmosphere while the web is heated to an orientation temperature between the first and second order phase transition temperatures of the polymeric material. The reduced pressure exerts stretching or tension force on the opposite sides of the web whereby the web is stretched normal thereto. The web is then passed through a quenching liquid such as water to bring the web to below its second order phase transition temperature. This leaves the cells stretched longitudinally across the thickness of the web.

In an alternative system, the cells are stretched in the direction across the thickness of the web by a pair of endless belts which are directed along diverging paths. The belts grip the opposite sides of the web and urging them away from each other in directions normal to the sides or thickness of the web. The gripping force between the belts and the web is provided by a pressure-sensitive adhesive on each belt that is strong enough for the belt to grip the web surfaces but weak enough so that the belt can be peeled from the web surface by turning around a roller at the end of divergence when the belt reverses its path of travel.

In lieu of gripping the web surface by an adhesive on each of the two the diverging belts, each belt may be made porous so that it grips the surface of the web by suction from a partial vacuum behind the belt.

In a further alternative to gripping the web surface by adhesive, or suction, each belt may be made to grip the web by tiny hooks on the belt. The hooks face in the direction of belt movement so that they dig into the surface of the web and hold on while the belts diverge from one another. At the end of divergence, as the belt begins to move around the roller to reverse its path of travel, a rod adjacent to the roller, cams the hooks out from the surface of the web.

U.S. Pat. No. 3,655,311 patented Apr. 11, 1972 by L. C. Porter describes a square tunnel having a pair of parallel moving side conveyer walls, one moving bottom conveyer panel, and a weighted top panel. The bottom conveyor panel and top panel each have a paper liner that moves with the conveyor. A nozzle that reciprocates laterally on a cradle pumps liquid foam forming stock onto the bottom conveyor paper liner. The stock expands to the paper liners on the side conveyor walls and to the paper liner on the top wall. The paper liners on the bottom and side walls move the foam down the tunnel, and the expanding foam, when it reaches the top wall paper liner, pulls that paper liner along. The top wall is weighted to confine the foam to the tunnel and help square it off. The weight of the top wall is not so heavy, however, that it flattens the cells.

Referring to FIGS. 1 and 2 of prior art apparatus 30, and to FIG. 4 of the definitions of certain terms, nozzles 34 apply foam forming stock 36 to conveyor belt 40 which moves over end roller 38 in direction 44. The speed of conveyor belt 40 and rate of delivery of foam from nozzles 34 are matched so that supply to the belt is continuous and does not back up on the nozzles.

The foam stock expands 32 in all directions including the X direction transverse to the conveyor belt travel and overall foam travel, in the Z direction in the direction of belt travel and reverse to belt travel, and in the Y direction which is perpendicular to the horizontal belt and vertical to gravity, that is, plumb to gravity when the belt is horizontal.

The expanding foam is confined in the X directions by side belts 54 and 56 which move over end rollers 58 and 60 respectively.

As stated earlier, the compressive strength of structural foam is parallel to the direction of rise. This may be related to vertical stacking of the cells, sphericity of each cell, and if the cell is not perfectly spherical, vertical orientation of an elongation of the cell.

In FIG. 4, maximum compressive strength in direction Y would be provided by cell orientation of cell group 64 of a preferable structural foam billet 66 wherein the cells are stacked in parallel alignment with vector Y as shown in FIG. 5 magnification of section 5 of FIG. 4.

In FIGS. 1 and 2, the cells in structural prior art foam billet 42 are not oriented in a way that provides maximum compressive strength in direction Y because expanding cells are skewed by expanding adjacent cells which are laid down moments earlier or later. Cells laid down at different moments in time are at the same moment in different stages of expansion, in different states of cure, and have different outer layer resiliency or yield to adjacent expanding cells of different moments in time. Thus, with the best effort to synchronize conveyor speed with lay down of foam forming stock, this dynamic difference between cells in lay down causes skew in cell stacking and in cell elongation away from direction Y.

Skewed cells are shown in FIG. 3 magnification of section 3 of FIG. 2. Maximum compressive strength in direction Y would not be provided by cell orientation of cell group 46 of structural foam billet 42 wherein the cells are stacked 62 out of alignment with vector Y, and individual elongated cells 52 and 70 have their respective axis 68 and 72 out of alignment with vector Y.

For purpose of description of the invention, the term "foam billet" is meant to include foam sheets and bars.

SUMMARY OF THE INVENTION

It is one object of the invention to provide an apparatus which makes structural foam having high compressive strength in the Y direction.

It is another object that the apparatus makes the structural foam in continuous billet on a moving conveyor.

It is another object that cells in the structural foam are stacked in the Y direction.

It is another object that successive groups of cells along the Z direction of the structural foam are stacked in the Y direction.

It is another object that the predominance of elongated cells in the structural foam have their axis aligned in the Y direction.

It is another object that the compressive strength of successive groups of cells along the Z direction of the structural foam is highest in the Y direction.

It is another object that the compressive strength of successive groups of cells along the X direction of the structural foam is highest in the Y direction.

It is another object to provide a lower density structural foam having high compressive strength in the Y direction.

Other objects and advantages will become apparent to a reader from the ensuing description of the invention.

In the following description and the claims, foam forming stock is the foam making material before it completely expands. The material condition may be before, within, or just past the gelation stage, and accordingly may include gas bubbles and may be liquid, to viscous, to soft doughy.

A plurality of foam forming stock deposits are laid on a moving conveyor in predetermined order, each deposit has a quantity of mass and is separated from an adjacent deposit in the direction of conveyor movement by a space of lesser mass. The mass of each deposit and space between the deposits is so related that the deposits expand and join to adjacent deposits to form a structural foam billet. Each deposit is a ridge extending laterally to the direction of conveyor movement, and the deposits are spaced from one another along the direction of conveyor movement.

A stream of foam forming stock is deposited from a nozzle onto the surface of a moving conveyor in a manner in which the mass of the foam forming stock varies between high and low over a first length of the conveyor surface, the total of the varying mass being laid over the first length being sufficient to form the structural foam billet over the first length.

A stream of foam forming stock is deposited from a nozzle onto the surface of a moving conveyor in a manner in which the mass of the stream varies between high and low over a plurality of sequential time periods as it is laid on the conveyor surface, laying sufficient total mass over the plurality of sequential time periods to form the structural foam billet.

A structural foam billet is made from a plurality of blobs of foam forming stock which were spaced from one another in a predetermined order and expanded into the structural foam billet.

BRIEF DESCRIPTION OF THE DRAWINGS

In order that the invention be more fully comprehended, it is described, by way of example, with reference to the accompanying drawings, in which:

FIG. 9 is a schematic top view of elements of the apparatus of

FIG. 8.

FIG. 11, including

DESCRIPTION OF THE PREFERRED EMBODIMENTS

Figure 1:
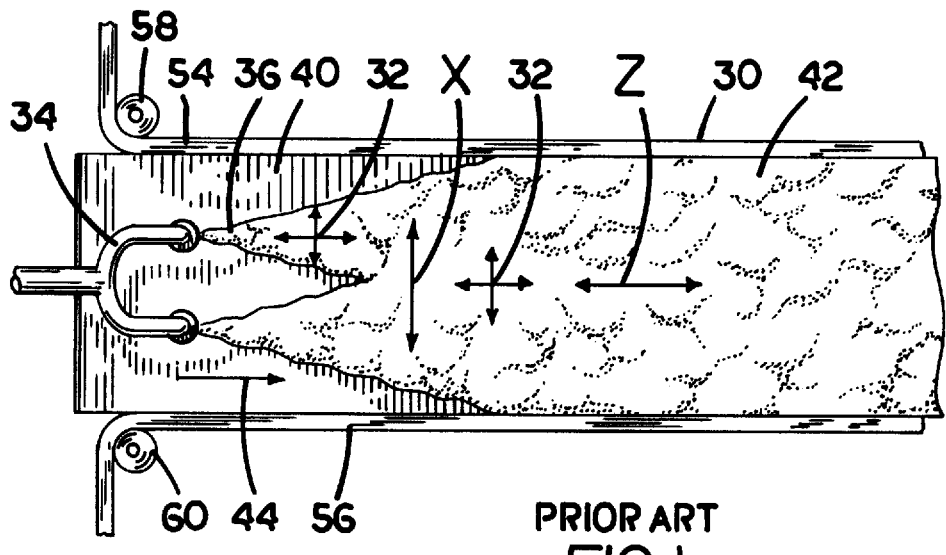
FIG. 1 is a schematic top view of a prior art apparatus for manufacturing structural foam.
Figure 2:
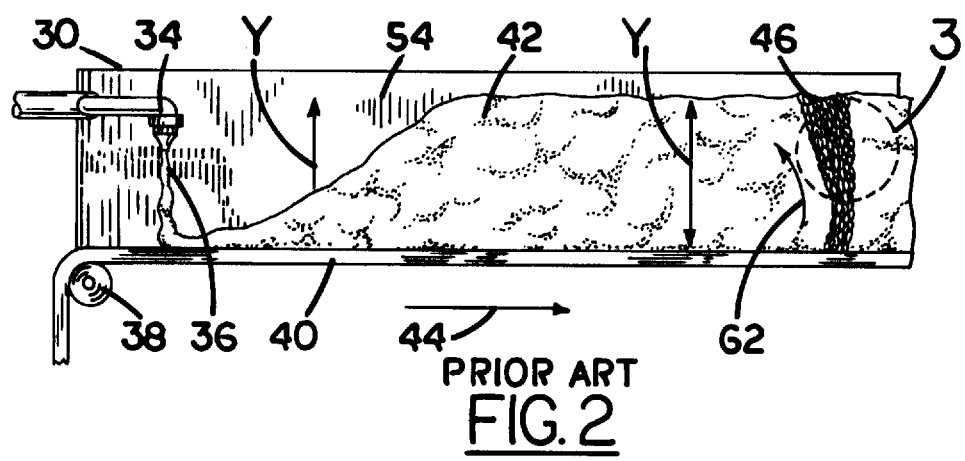
FIG. 2 is a schematic front view of the apparatus of FIG. 1. For clarity of description only one, side guide belt 54 is shown.
Figure 3:
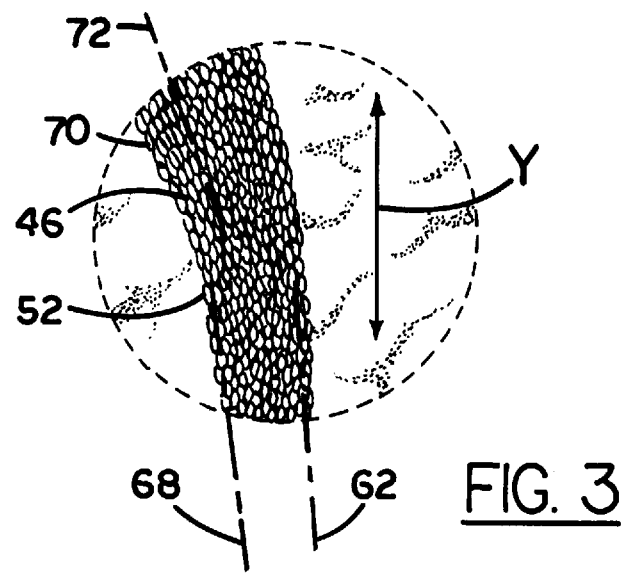
FIG. 3 is a magnification view of section 3 of FIG. 2.
Figure 4:
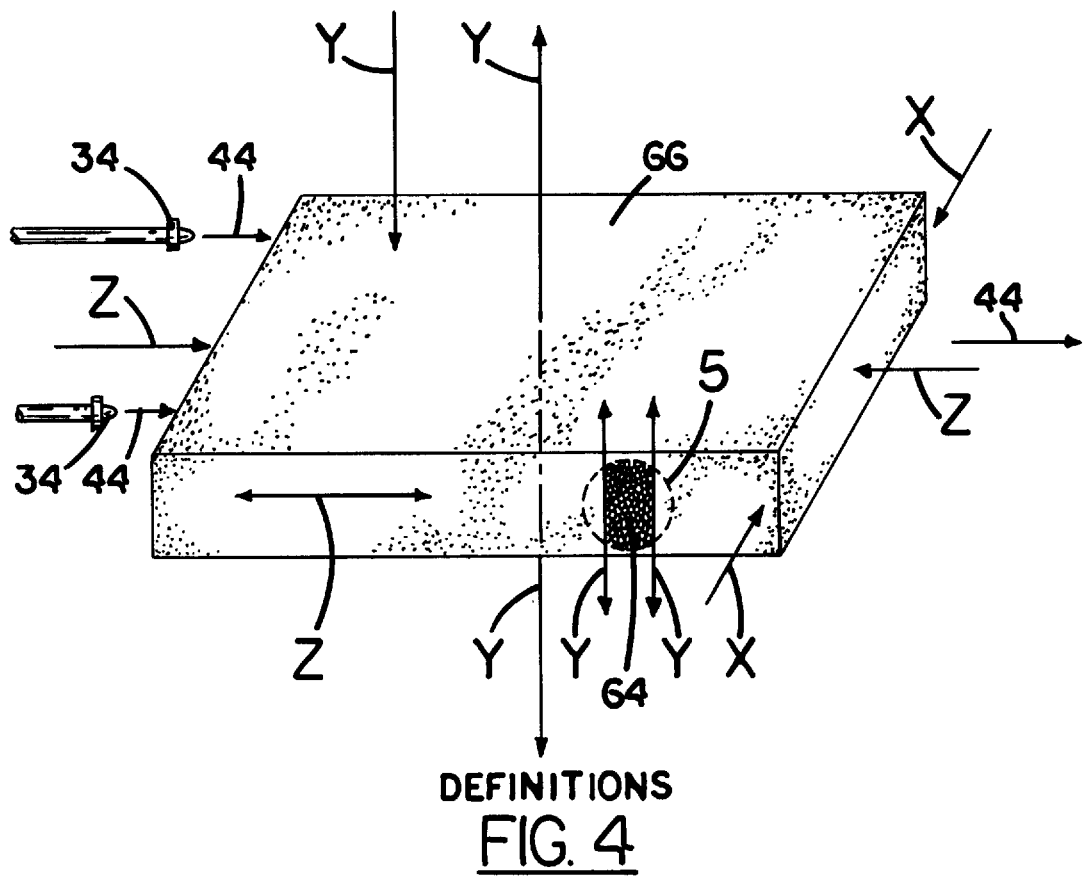
FIG. 4 is a schematic representation of the definitions of certain terms used in the present specification.
Figure 5:
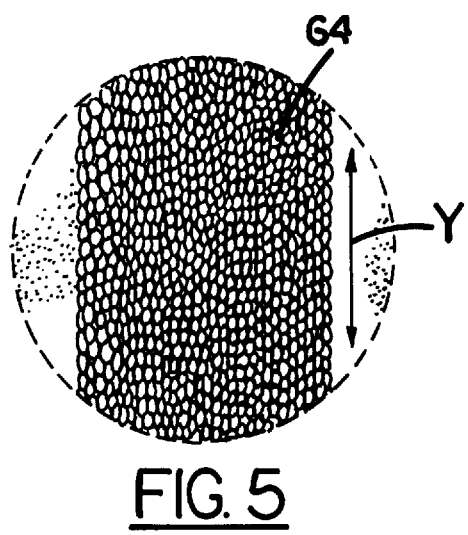
FIG. 5 is a magnification view of section 5 of FIG. 4.

Before explaining the invention in detail, it is to be understood that the invention is not limited in its application to the detail of construction and arrangement of parts illustrated in the drawings since the invention is capable of other embodiments and of being practiced or carried out in various ways. It is also to be understood that the phraseology or terminology employed is for the purpose of description only and not of limitation.

The American Society for Testing and Materials (ASTM) offers two methods which can be used to measure the compressive strength of polyiso foams. They are ASTM D 1621 Standard Test Method for Compressive Properties of Rigid Cellular Plastics, and ASTM C 165 Standard Test Method for Measuring Compressive Properties of Thermal Insulations. Basically a force is applied at a fixed rate to a sample of foam and the resistance by the foam to the force is measured. The compressive strength is defined as that force in pounds which causes 10 percent deformation or yield which ever comes first, divided by the surface area of the sample in square inches.

Deformation is change in form from the applied force or stress. The change continues in a uniform relationship to the increasing force until the yield point is reached in which the change continues in a non-uniform relationship to further increasing force, such as when the bonds between cells break or the foam fractures.

In one calculation for example, if a sample of foam 2 inches by 2 inches by 2.5 inches thick is compressed parallel to the direction of thickness, or along the Y vector, 0.25 inches by a force of 128 pounds without any yield, the compressive strength in the Y direction will be 32 psi.

In the prior art when rigid foam is made continuously on a double belted laminator, that is, between a top or ceiling belt and a bottom conveyor belt, pressure is applied continuously to the reacting foam by the two belts. The sides are also constrained so that the foam enters a tunnel and has only one place to expand toward during the rise, it is along the conveyor belt back toward the foam delivery nozzle. In order to pack enough foam in the tunnel to fill to the sides, the conveyor belt speed is slowed which tends to orient the foam expansion even more toward the nozzles in the Z direction, which is detrimental to obtaining Y cell orientation.

A panel of commercial polyisocyanurate foam roof insulation produced on a double belted laminator was obtained. The panel foam was made with blowing agent HCFC-141B. The panel had fiberglass facers and was 3.25 inches thick. The facers were removed. Core density was measured and found to be 1.78 pcf (pounds per cubic foot).

Samples were cut from the panel and tested for compressive strength in the X, Y, and Z directions. The results are given in Table I. They show that the maximum strength is in the Z direction, as expected by the above analysis of how the foam was formed.

TABLE I

| Polyisocyanurate Roofing Panel | | | |
| --- | --- | --- | --- |
| Direction | X | Y | Z |
| Compressive strength psi | 13.5 | 16.1 | 25.0 |
| Yield % | 8.4 | 7.6 | 5.2 |

A sample of a phenolic foam panel with wafer board facers was obtained and tested. The way it was produced is not known. The facers were removed and the core density was determined to be 2.35 pcf. The compressive strength was measured in the three directions and is tabulated in Table II. The same pattern as in the polyisocyanurate foam is evident in Table II, that is, one side shows maximum compressive strength and the Y value is a minimum.

TABLE II

| Phenolic Foam Panel | | | |
| --- | --- | --- | --- |
| Direction | Y | Side 1 | Side 2 |
| Compressive strength psi | 15.0 | 21.8 | 28.3 |
| Yield % | 2.8 | 6.0 | 4.5 |

A sample of polyisocyanurate foam was made on a double belted laminator with the belts traveling too fast. The rising foam did not meet and adhere to the upper facer. This is what is commonly referred to as free rise conveyor foam.

TABLE III

| Free Rise Conveyor Foam | | | | | | | |
| --- | --- | --- | --- | --- | --- | --- | --- |
| Direction | X | Z | Y | 45* | 135* | 67* | 113* |
| Compressive strength, psi | 12.0 | 17.1 | 33.2 | 26.3 | 21.5 | 34.1 | 26.3 |
| Yield % | 10.0 | 5.3 | 4.1 | 5.5 | 5.5 | 4.6 | 10.0 |

*Samples are cut at an angle to the Z line equal to these degrees, and tested in that direction. Y is equal to 90 degrees, Z is equal to 0 degrees and 180 degrees.

Samples are cut at an angle to the Z line equal to these degrees, and tested in that direction. Y is equal to 90 degrees, Z is equal to 0 degrees and 180 degrees.

The core density was 2.08 pcf. X, Y, and Z values appeared to confirm the common belief that the foam is oriented in the Y direction and provides maximum strength in that direction, but that is not so.

When test blocks were cut at different angles to the Z line and tested for compressive strength, a different pattern emerged. As shown in Table III, the maximum strength was actually at an angle less than 90 degrees but more than 45 degrees. An angle of 67 degrees gave the maximum value in this study. The values at 113 degrees and 135 degrees further confirmed that the foam is not oriented in the Y direction nor does it provide maximum strength in that direction. The values indicate that we are testing the side of a rising foam.

Figure 6:
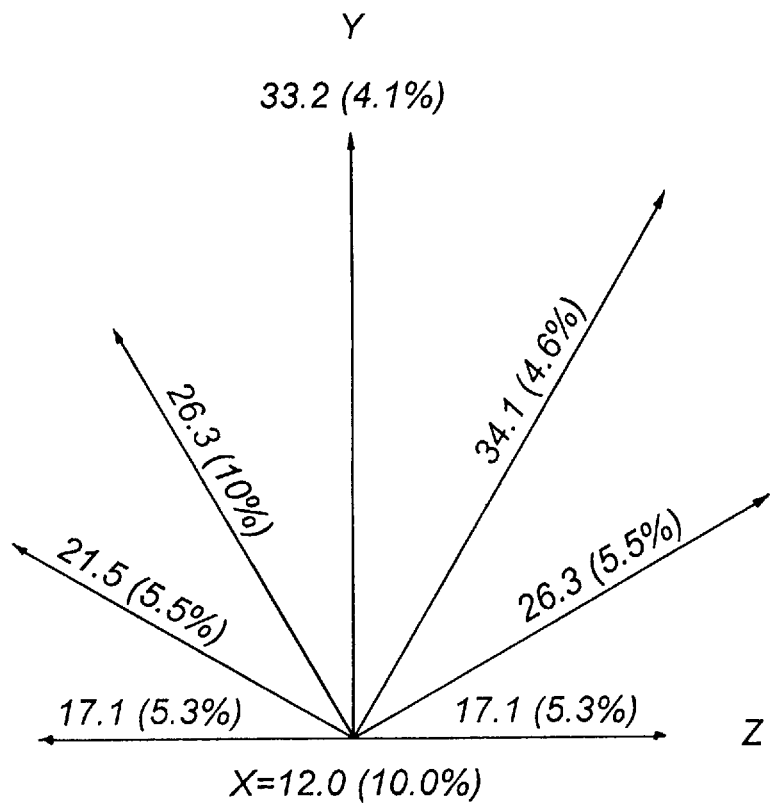
FIG. 6 is a vector graph of compressive strength at different angles for a prior art free rise conveyor foam.

Compressive strength at different angles for the free rise conveyor foam is shown graphically in FIG. 6. The vectors are constructed to scale. It is easy to see that there is more strength to the right of the Y axis.

Figure 7:
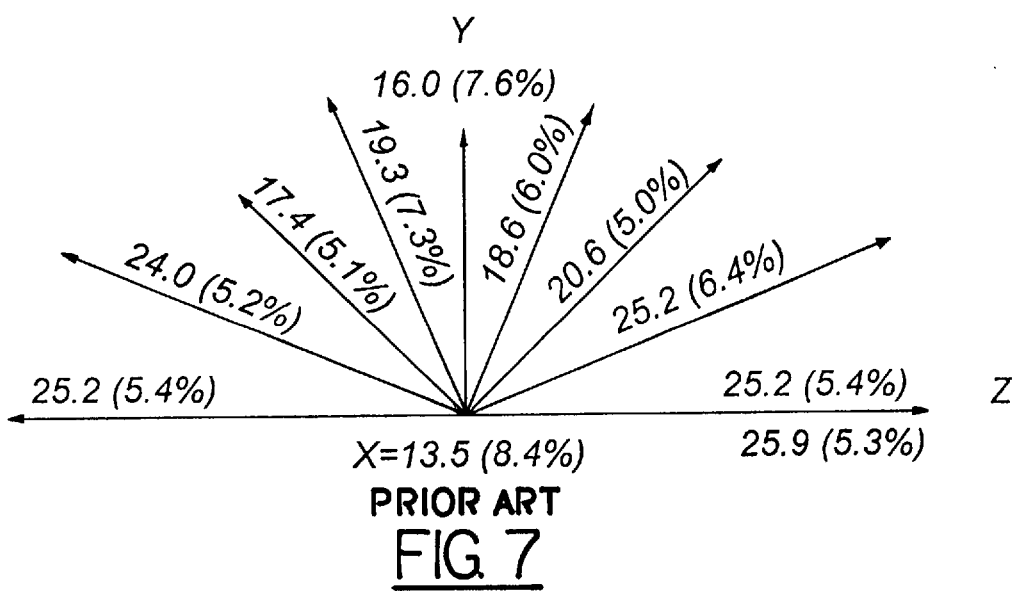
FIG. 7 is a vector graph of compressive strength at different angles for a prior art roofing foam panel.

In FIG. 7, a similar analysis was made at different angles of the commercial polyisocyanurate roofing foam panel described in Table I. FIG. 7 shows an approximately even distribution of strength on both sides of the Y axis. X, not graphed is 13.5 psi. at a yield of 8.4%. Essentially all the values other than Z are stronger than Y or X, but less than Z. This supports the hypothesis that the foam is rising at an angle away from Y toward Z.

The present invention overcomes this problem and provides foam having maximum strength in the Y direction.

Maximum compressive strength of polyurethane foam parallel to the direction in which the foam rises as shown in table IV, was produced in the following operations by the inventor.

This is illustrated in Table IV.

Three hand mixed test foam blocks, A, B, and C, were prepared.

A commercial polyisocyanurate system designed for a panel foam, produced on a double belted laminator was used. The formulation was proprietary, but it was based on a blowing agent consisting of HCFC-141B with water.

Foam block A was made from a two-component mix of (a) polymeric isocyanate, such as Dow Chemical's Papi 580, and (b) a blend of a polyol, the blowing agent, surfactants and catalysts.

In a one pint container, 106.2 grams of the (b) component was mixed with 193.8 grams of the (a) component for 10 seconds using a stirrer powered by an electric drill motor.

The mixture was poured immediately into a one gallon paper tub which was somewhat cylindrical. The tub measured 6.25 inches in diameter at the bottom. It was 8 inches high and measured 8 inches in diameter at the top.

After 21 seconds from the start of mixing, the foam started to rise, or initiated. At 41 seconds the foam reached the gel point which is determined by constantly poking the foaming mixture with a wood tongue depressor until it pulls out with a thread of polymer. At 49 seconds the surface was tack free and the rise had substantially stopped.

Foam block B was prepared in the same manner as sample A except at 39 seconds into the reaction a circular block of wood 6 inches in diameter was placed on top of the rising foam and force was applied until the reaction stopped at 50 seconds.

Foam block C was prepared in the same manner as sample A except at 30 seconds (11 seconds before gelation) a circular block of wood, 6 inches in diameter was placed on top of the rising foam and a restraining force was applied until the foam stopped moving at 50 seconds.

In all samples about 30 percent of the foam escaped the tub.

After sufficient time for cure, 30 days at room temperature, samples were cut from the middle of each foam block taking care to cut all samples from the same position. The samples were tested for compressive strength in the directions parallel to the direction of rise and perpendicular to the direction of rise.

Table IV shows that the application of force to the rising foam resulted in a slight increase in density. This increase in density translates to a higher compressive strength in both directions. However, the isotropic index which is the perpendicular-to-rise compression strength divided by the parallel-to-rise compression strength is essentially unchanged.

This shows that applying force alone to the rising foam will not change the shape of the cells or the anisotropic nature of the foams. Maximum strength is still parallel to the direction of the rise.

TABLE IV

| Foam Block | A | B | C |
|---|---|---|---|
| Density (pcf) | 2.21 | 2.22 | 2.25 |
| Compressive Strength Y Parallel (psi) | 37.2 | 36.4 | 40.2 |
| Yield (%) | 7.4 | 7.8 | 7.5 |
| Z or X Perpendicular (psi) | 19.3 | 20.1 | 22.1 |
| Yield (%) | 6.8 | 7.2 | 10.0 |
| Ratio, Isotropic Index | 52 | 55 | 55 |

In a preferred embodiment of the present invention the foam forming stock is laid down in a predetermined order of distinct blobs, each blob being of nondistinctive shape, on a moving conveyor such as a belt so that as the blobs rise and pack out the belt, the foam will expand forward and backward along the conveyor, forward and backward to conveyor travel. The middle of the blob will not move laterally on the belt, it will be in synchronous movement with the belt upon the area which it rests and will rise straight up in the Y direction for that area, providing the maximum compressive strength for the blob. Where the blobs meet and knit together the foam will be rising at an angle to X and Z. The strength there will be less than the maximum obtained at Y, but more than the strength usually provided by prior art foam in the angles between Y and X or Z, and will give the appearance and performance of being more isotropic.

In another embodiment of the invention, the foam forming stock which is the foam before it substantially expands and may be approaching, in, or just past the gelation stage, is shaped on the conveyor in a series of high mass deposits separated from each other by a space of lesser mass, and extending along the direction of conveyor movement. For example, in a plurality of elongated blobs or ridges laterally oriented to the length of the conveyor, each ridge being of nondistinctive shape, separated from one another along the direction of the length of the conveyor. The laterally oriented blobs are permitted to expand in the direction of conveyor movement and opposite to the direction of conveyor movement, whereby they join up to provide a foam billet which cures to desired hardness.

Figure 8:
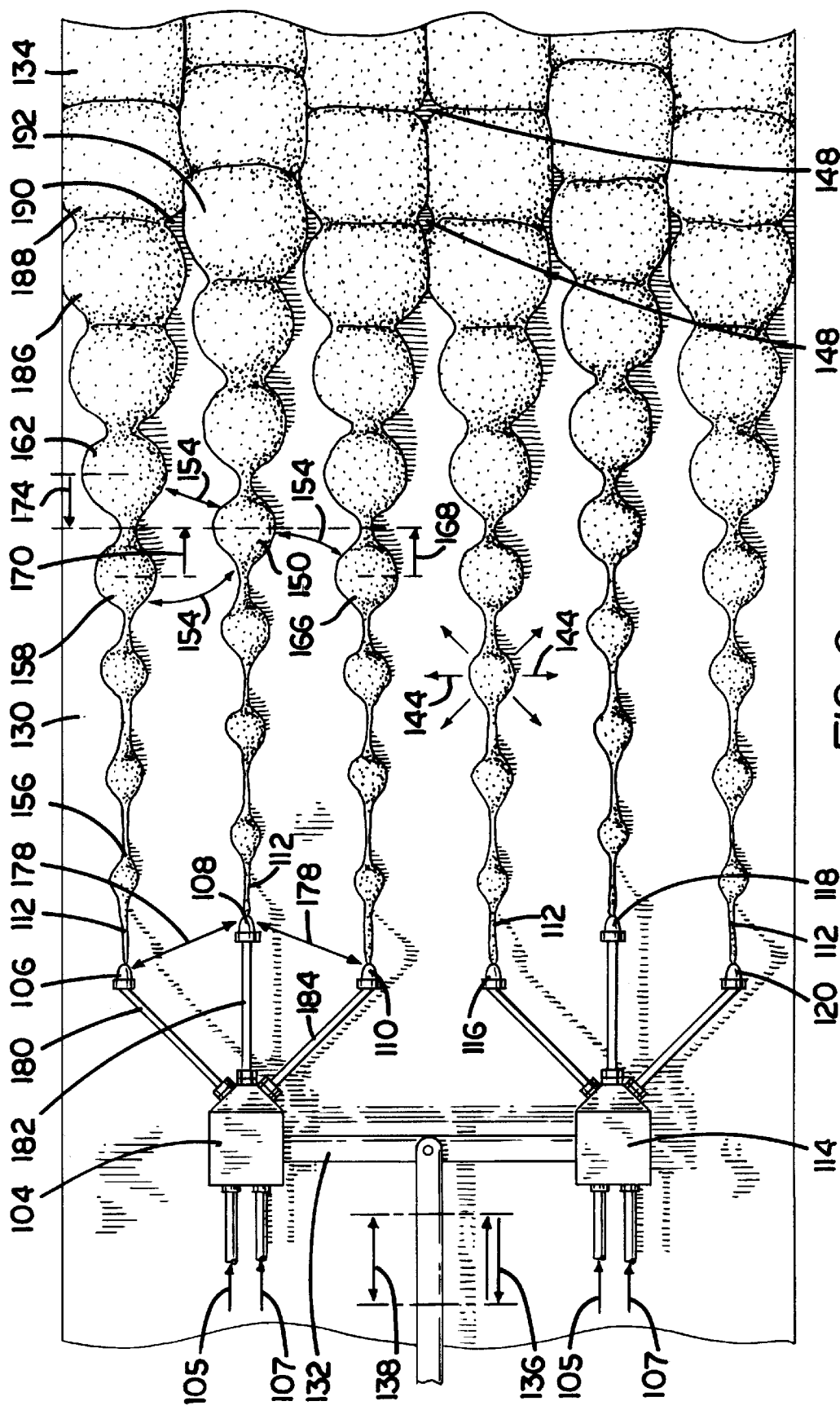
FIG. 8 is a schematic top view of an apparatus of the present invention.

In FIG. 8, mix head 104 delivers foam forming stock to lay down nozzles 106, 108, and 110. Mix head 114 delivers foam forming stock 112 to lay down nozzles 116, 118, and 120. Each nozzle ejects a continuous stream of foam forming stock. Total stock being laid is sufficient to make a continuous billet of structural foam of predetermined foam height and density.

Conveyor 130 is 50 inches wide to manufacture 48 inch wide continuous panel foam billet 134. Trim saws at the end of the line remove 1 inch from each edge.

It should be understood that the conveyor is a surface that moves the foam away from the nozzles. The conveyor may be, for example, a rubber or fiber belt, metal slats, or a carrier layer such as paper on the belt which may or may not be intended to stick to the surface of the billet, or a facer such as plastic sheet that is driven by the belt and is designed to stay as a lamination on the billet.

The mix heads are connected together by bracket 132 which is reciprocated 136 forward and backward to the direction of movement of the conveyor so that if the mix head reciprocation's forward advance is at the same speed as the conveyor, and oscillation is over a distance 138 of 4 inches, the blobs, for example, blobs 158, 162, and 166, formed by the nozzles will start every 8 inches along the length of the conveyor.

This provides a series of high mass deposits, each being separated by a space of lesser mass surrounding the blob and between the blob and adjacent blobs, extending in a predetermined pattern along the direction of conveyor movement. The mass in the space 156 between the blobs in the line of deposit is less than would be sufficient to form at that location, the predetermined height of structural foam. This is also so of the low-mass space around a blob. The high mass deposits are in the form of blobs because they are deposited by the plurality of nozzles spaced from one another laterally to the movement of the conveyor. As the blobs move away from the mix heads and nozzles, each begins to expand 144 in all directions 360 degrees around the blob and fill out the panel.

In order to avoid an air trap 148 between expanding blobs, the blobs are laid in a way that laterally adjacent blobs are spaced forward or backward on the conveyor from one another. Blob 150 which is laterally adjacent 154 to blobs 158, 162, and 166 is spaced forward 168 of blob 166, forward 170 of blob 158, and backward 174 of blob 162. The length of tubes 180, 182, and 184 of nozzles 106, 108, and 110 are different. Nozzles 106, 108, and 110 which are laterally adjacent 178 one another are spaced forward or backward in the direction of conveyor movement, so that with each nozzle laying down a blob at the same time as the other nozzle on the moving conveyor, laterally adjacent blobs are laid spaced forward or backward on the conveyor from one another. In this manner, blob 192 is positioned to expand into the area of joining 190 between adjacent blobs 186 and 188. If a facer is laminated over the foam billet, holes may be provided through the facer to vent trapped air between the billet and facer.

Figure 9:
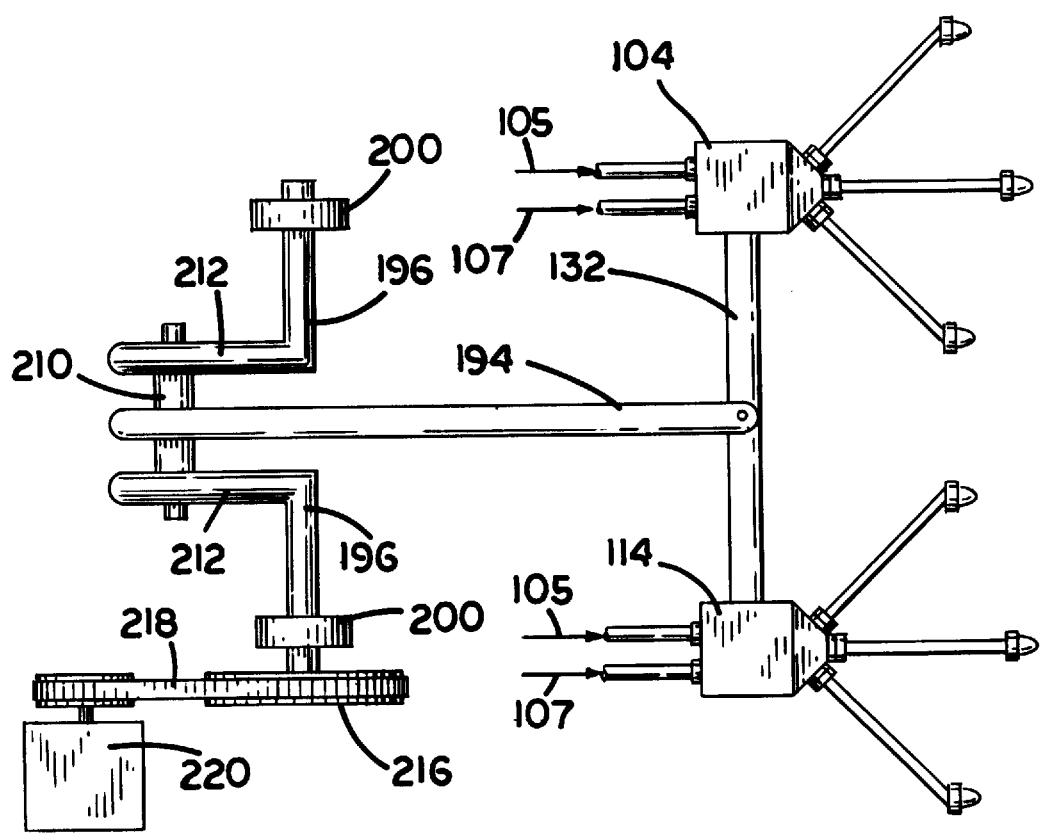
Figure 10:
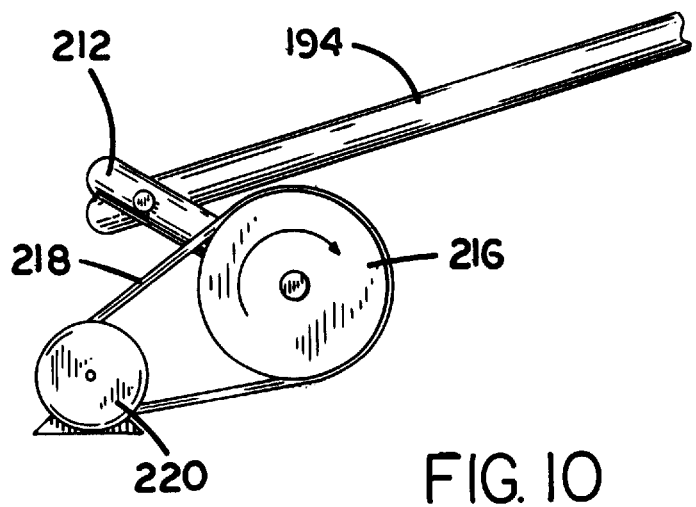
FIG. 10 is a schematic front view of elements of the apparatus of FIG. 8.
Figure 11A:
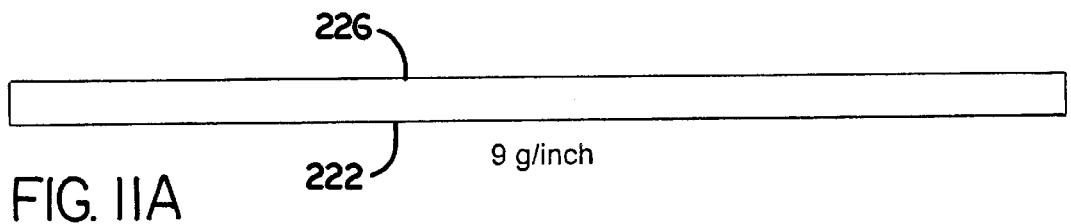
FIGS. 11A–11G, is a chart of operations of elements of FIG. 8.
Figure 11B:
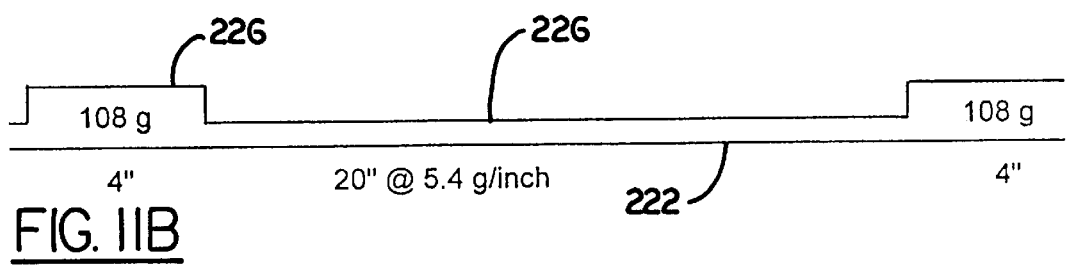
Figure 11C:
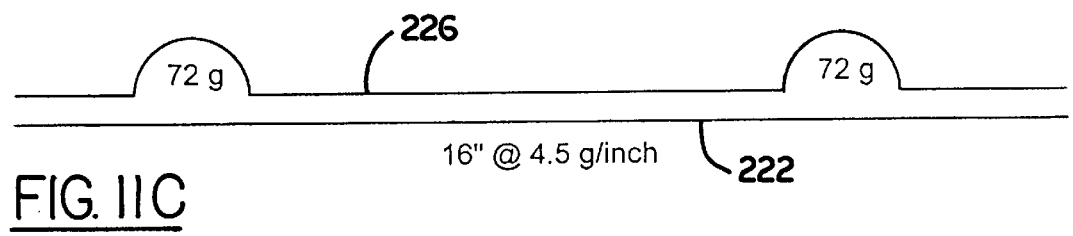
Figure 11D:
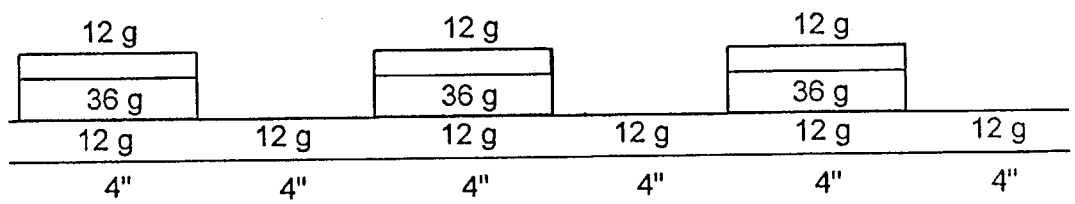
Figure 11E:
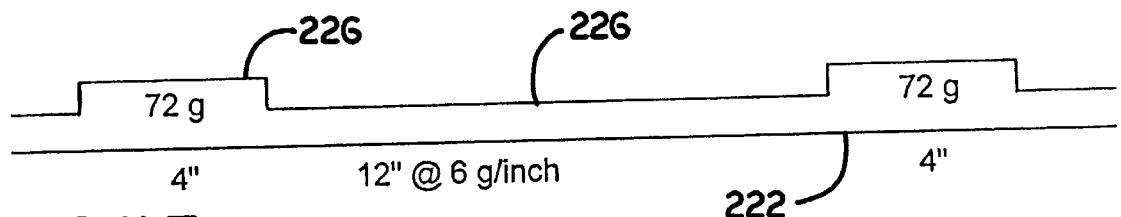
Figure 11F:
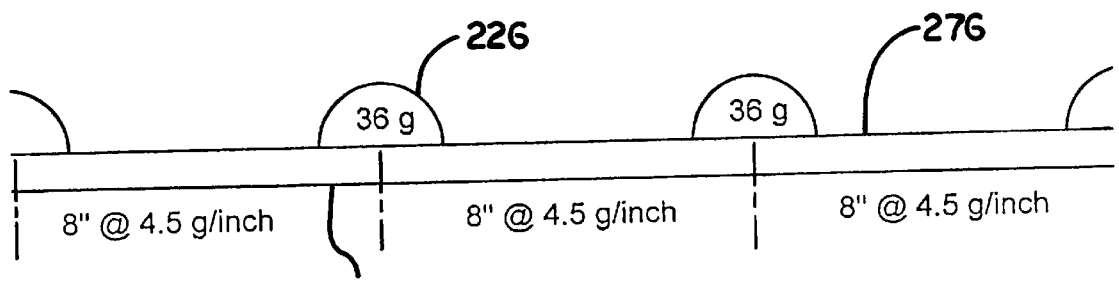
Figure 11G:
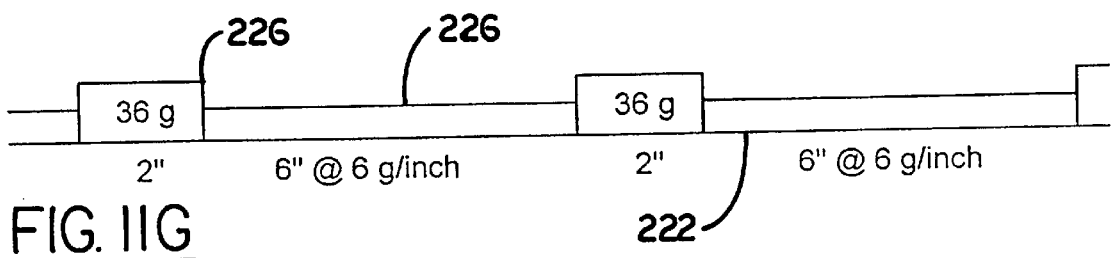

Referring to FIGS. 9 and 10, crank shaft 196 drives connecting rod 194 by way of crank arm 212 and main bearing shaft 210. The crank shaft is supported by bearings 200 attached to the main frame of the conveyor. Main bearing shaft 210 is adjustable along crank arms 212 so that the distance of reciprocation of mix heads 104 and 114 can be adjusted. Fly wheel 216 is driven by belt 218 and variable speed motor 220.

By adjusting the motor speed, the velocity of reciprocation of the heads can be varied. The heads are supported from above by a movable suspension system which is not shown and can be readily provided by one skilled in the art.

Referring to FIGS. 8–11, one example of the above system operation is as follows: Let us use a laminator which is 60 feet long and a nominal 4 feet wide, with the thickness between the top of the tunnel and the bottom of the tunnel set for 2 inches. The panel we will produce will be a roofing panel with flexible fiber glass facers coated with a plastic emulsion.

The combined flow rate of polymeric isocyanate 105 and compounded polyol 107 is set at 85.6 pounds per minute. The line speed is set at 60 feet/minute or 12 inches/second. The overall density will be 2.08 pcf and the core density will be 1.77 pcf. The core is the foam with the usual densified layer that adheres to facers, removed. The density is calculated as follows: 85.6 lbs/min×1 min/60 ft.×1/49.5 in×½ in×144 sq in/1 sq ft=2.08 pcf.

Core density equals 85 percent of overall density. Therefore core density will be 1.77 pcf. 2.08×0.85=1.77 pcf. Now if the 85.6 pounds/minute is divided into six streams, each stream will be 14.27 pounds per minute. Converting this to grams per second gives a value of 108. Dividing 108 grams/second by the line speed, 12 inches per second, gives a lay down rate of 9 grams/inch/stream. The Rpm's (revolutions per minute) of fly wheel 216 is related to the average velocity of the mix heads by the following formula:

Revolutions/min×1 min/60 seconds×travel in inches/cycle×2 cycles/Rev.=inches/second.

Using this formula and the line speed of 12 inches/second, along with the lay down rate of 9 grams/second, lay down patterns may be calculated.

In FIG. 11, schematically shows some patterns of lay down of foam forming stock 226 on conveyor surface 222 that result from a single nozzle by varying the Rpm's and the travel distance of the oscillating head. The patterns are idealized because the velocity of the head is assumed to be constant although it is actually accelerating or decelerating. Also the momentum of the dispensing foam forming stock when the heads move is not taken into account. The ejection rate from the nozzle is 108 grams per second. The conveyor speed is about 12 inches per second.

At A, dispenser travel is 0. Crankshaft rpm is 0. Lay down is a constant 9 grams/inch.

At B dispenser travel is 8 inches. Crankshaft rpm is 30. Lay down is a series of 108 gram, 4 inch long masses, separated by a space of 20 inches at 5.4 grams/inch.

At C, dispenser travel is 8 inches. Crankshaft rpm is 45. Lay down is a series of 72 gram narrow blobs, separated from their centers by 16 inches at 4.5 grams/inch.

At D dispenser travel is 8 inches. Crankshaft rpm is 90. Lay down is 4 inch long blobs of 60 grams, separated by space of 4 inches at 3 grams/inch. Because the head is traveling faster than the belt (24 inches/second versus 12 inches/second) foam forming stock is poured on top of foam forming stock already deposited on the belt.

At E dispenser travel is 4 inches. Crankshaft rpm is 45. Lay down is a series of 72 gram, 4 inch long masses, separated by 12 inches at 6 grams/inch.

At F dispenser travel is 4 inches. Crankshaft rpm is 90. Lay down is a series of 36 gram narrow blobs, separated from their centers by 8 inches at 4.5 grams/inch.

At G dispenser travel is 2 inches. Crankshaft rpm is 90. Lay down is a series of 36 gram, 2 inch long masses, separated by a space of 6 inches at 6 grams/inch.

With the wide variation in the pattern of blobs that are possible by varying the above two variables, shown in FIG. 11, it is relatively easy to optimize the compressive strength for products which are different based on thickness, different facers and and resin systems. With strength optimized it is possible to lower the density of the resin formulation in order to reduce the cost of the product while maintaining specification compressive strengths. The preferable range of space between blobs to thickness of the billet formed by the blobs when they expand and join together is about 2 to 8 times the thickness of the billet.

Oscillating the dispenser and providing blobs which expand toward one another in the invention is not limited to use with the six stream dispenser of FIG. 8. It can be applied with a manifold that distributes the foam forming stock in many small streams across the width of the conveyor. It can also be applied by intermittent flow from a nozzle as it oscillates horizontally in an arc.

Figure 12:
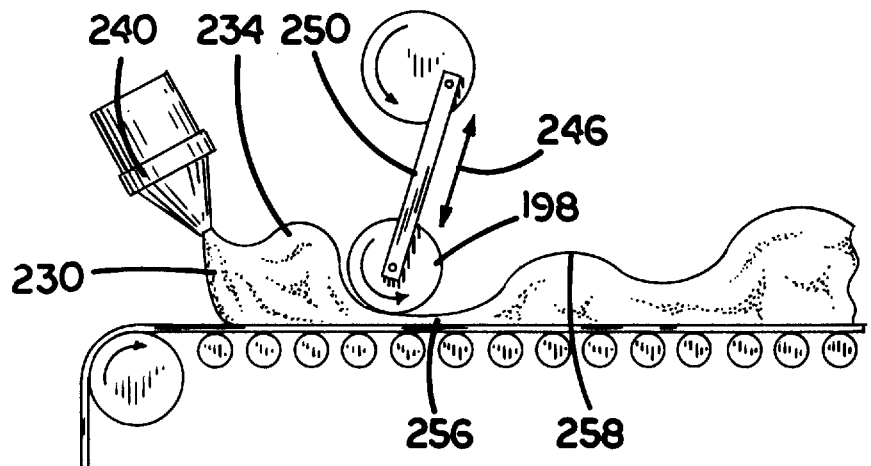
FIG. 12 is a schematic front view of an apparatus of the present invention.
Figure 13:
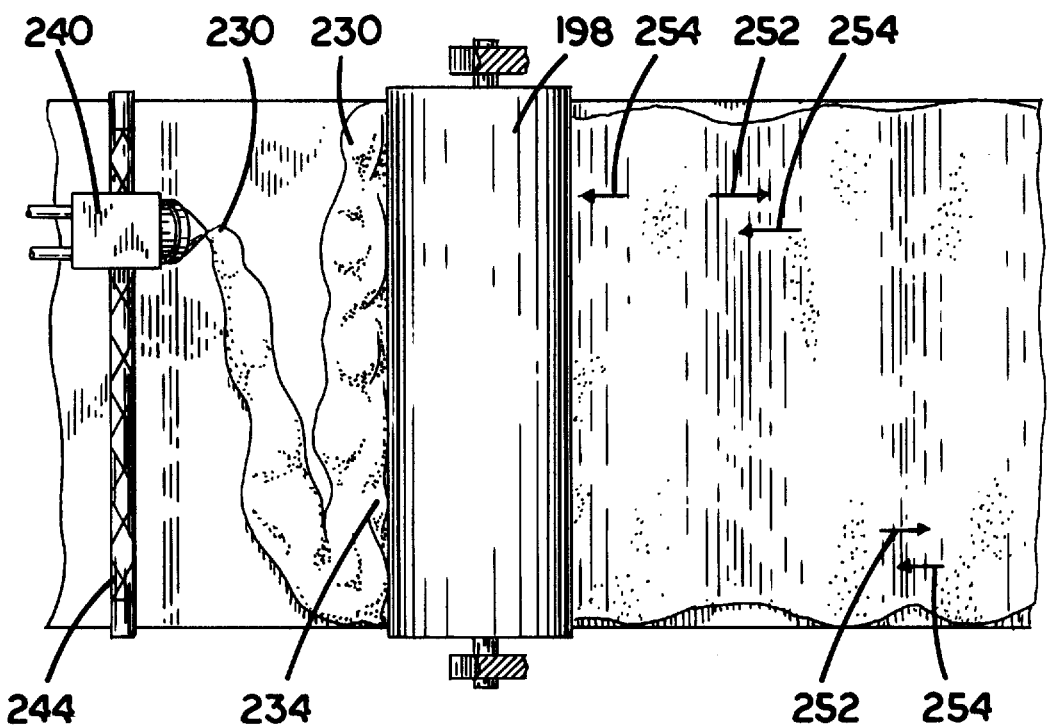
FIG. 13 is a schematic top view of the apparatus of FIG. 12. An eccentric drive is removed for clarity of description.

FIGS. 12 and 13 show a nip roll 198 used to meter and distribute the foam forming stock. Foam forming stock 230 is contained in a rolling bank 234 and is metered under roll 198. Mix head 240 driven by screw shaft 244 moves from side to side across the conveyor. In the prior art manufacturing process, the gap of the nip roll would be adjusted to provide the desired thickness of the product being produced, and held at that gap, and the chemical flow rate and line speed would determine the rate of production. In the present invention, the nip roll is cycled up and down 246 by eccentric drive 250. The amount of foam forming stock is metered for travel along the conveyor by nip roll 198 from almost nil mass 256 to twice the standard amount 258 for the desired thickness of the product being produced.

This results in distinct blobs extending across the conveyor in a predetermined order which, past the pinch roll, expand forward 252 and backward 254 to the direction of conveyor movement, to provide a product with improved compressive strength by virtue of transverse rows of cell orientation in the Y direction and cell expansion in the Y direction.

Figure 14:
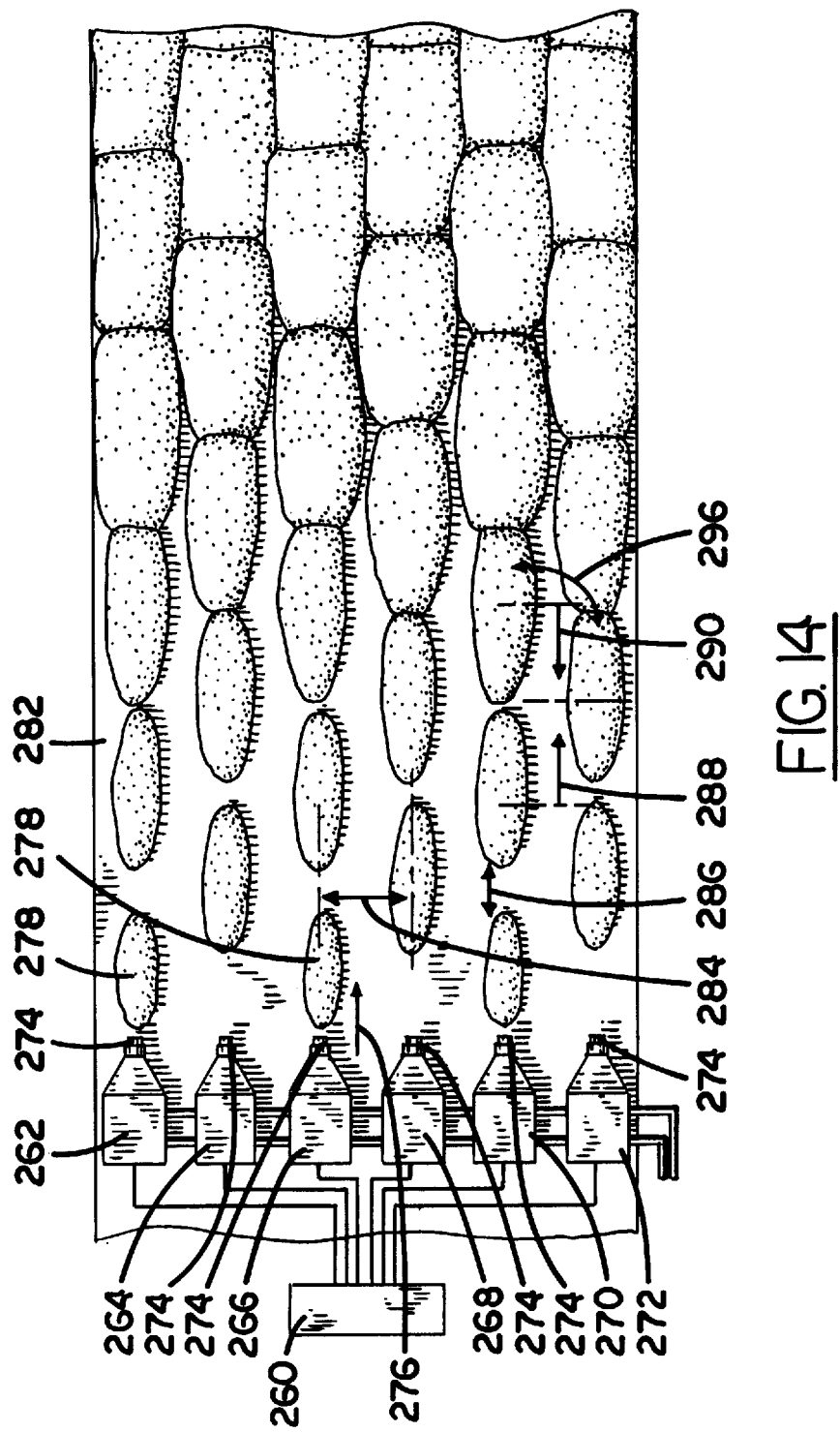
FIG. 14 is a schematic top view of an apparatus of the present invention.

In FIG. 14, programmer 260 operates mixers 262, 264, 266, 268, 270 and 272 in a preprogrammed sequence that causes them to deliver 276 foam forming stock 278 through their nozzles 274 at different times from one another. The timing is set to provide a plurality of blobs on moving conveyer 282 in which blobs are laterally spaced 284 from one another, and spaced from one another along the conveyor movement direction 286 which is the lengthwise direction, of conveyor 282. The programmer timing is also set to deposit the blobs so that laterally adjacent blobs are laid spaced forward 288 or backward 290 on the conveyor from one another between 296 adjacent blobs. The blobs are in a predetermined order or arrangement.

Figure 15:
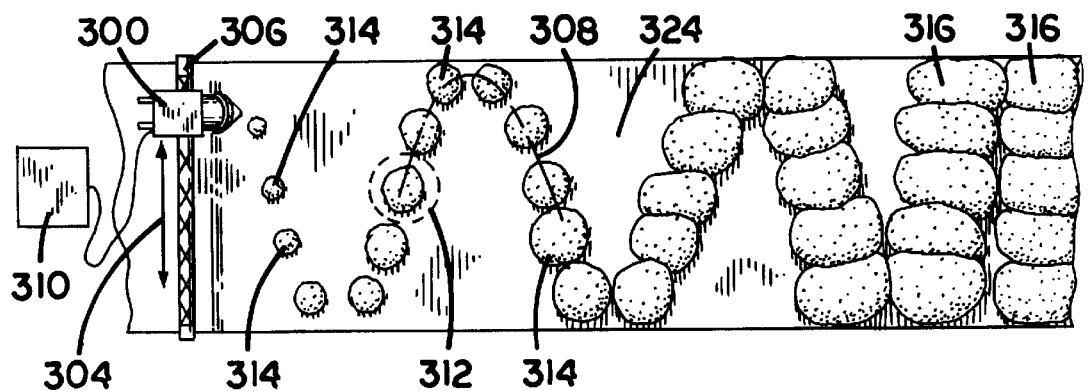
FIG. 15 is a schematic top view of an apparatus of the invention.

In FIG. 15 nozzle 300 reciprocates laterally 304 on screw 306 to conveyor 324 movement, and is operated by programmer 310 to eject blobs 314 of varying mass calculated to expand to form a billet 316 of a desired height of structural foam which moves along with conveyor 324. The mass in the space between the blobs in the line of deposit 308 is less than would be sufficient to form at that location, the desired height of structural foam. Preferably this is also so of the low-mass space surrounding 312 a blob. Each blob expands in all directions including the Y direction so that cells stack in the Y direction and approach the shape of perfect spheres before the blob expands into an adjacent blob providing the desired height of structural foam.

The invention's individual blobs arranged in predetermined pattern or arrangement and size can be made small and in high population to space ratio, so that cells in the center of each blob encounter less numbers of adjacent cells providing a greater percentage of cells stacked in the Y direction in each blob and in the resulting billet.

Figure 16:
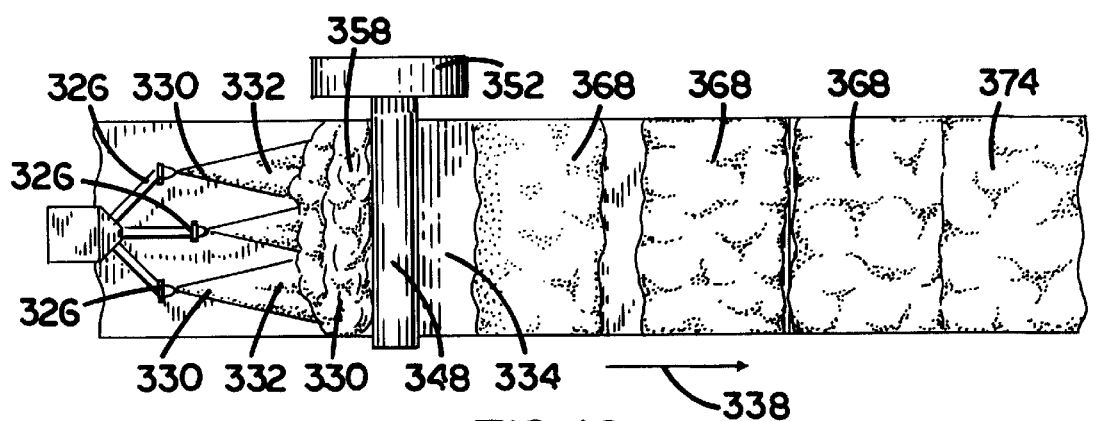
FIG. 16 is a schematic top view of an apparatus of the invention.
Figure 17:
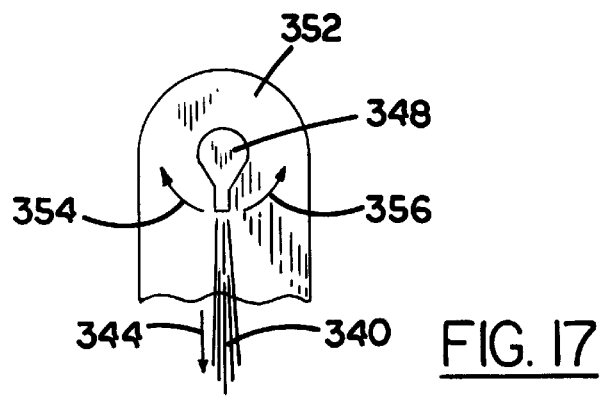
FIG. 17 is a schematic front view of elements of the apparatus of FIG. 16.

In FIGS. 16 and 17, nozzles 326 deliver foam forming stock 330 in streams 332 to conveyor 334 which is moving away 338 from the nozzles. The streams of foam forming stock are intercepted by a thin air curtain 340 ejected 344 by an air knife 348 which is oscillated by drive 352 toward 354 and away 356 from the nozzles. When the air curtain swings toward the nozzles the foam is banked up 358 by the air curtain. When the air curtain swings away from the nozzles the banked foam blob 368 moves along with the conveyor passing by the air knife in direction 338. Further on, the banked foam blobs expand and join together to form foam billet 374.

The present invention is not limited to use of the above described means for making the mass of foam forming stock variable along the conveyor in the lengthwise or movement direction of the conveyor. For example, the speed of the conveyor can be made to periodically slow to form blobs of higher mass, each blob surrounded by less mass, or the nozzles or means delivering the foam forming stock to the conveyor can be oscillated vertically, or delivery of the foam forming stock to the conveyor can be intercepted by oscillating flat or cup shaped interrupter means which temporarily periodically hold the stock, the pinch rolls being one example, and cause the amount of foam forming stock along the conveyor to vary.

Although the present invention has been described with respect to details of certain embodiments thereof, it is not intended that such details be limitations upon the scope of the invention. It will be obvious to those skilled in the art that various modifications and substitutions may be made without departing from the spirit and scope of the invention as set forth in the following claims.

What is claimed is:

1. A method for making structural foam having high compression strength in the Y direction comprising:

laying a plurality of foam forming stock deposits on a moving conveyor in predetermined order, each deposit having a quantity of mass and being separated from an adjacent deposit in the direction of conveyor movement by a space of less to no mass of said foam forming stock, and making the mass of each deposit and space between the deposits so related that the deposits expand and join to adjacent deposits to form a structural foam billet.

2. The method of claim 1 wherein each deposit is a ridge extending laterally to the direction of conveyor movement, and the deposits are spaced from one another along the direction of conveyor movement.

3. A method of making a structural foam billet of predetermined thickness having high compression strength in the Y direction comprising depositing a stream of foam forming stock onto the surface of a moving conveyor in a manner in which the mass of the foam forming stock varies a plurality of times over a first length of the conveyor surface in the direction of movement of the conveyor surface, the total of the varying mass being laid over the first length being sufficient to form the structural foam billet over said first length.

4. A method of making a structural foam billet of predetermined thickness having high compression strength in the Y direction comprising depositing a stream of foam forming stock onto the surface of a moving conveyor so that the mass of the stream varies between high and low over a plurality of sequential time periods as it is laid on the conveyor surface, sufficient total mass being laid over the plurality of sequential time periods to form the structural foam billet.

5. The method of claim 4 wherein the mass laid down in a plurality of the low mass time periods is less than enough to form the structural billet at the location on the carrier of the mass laid down during said plurality of the low mass time periods.

6. The method of claim 4 wherein the mass of the stream varies down to zero during the plurality of periods.

7. The method of claim 4 wherein the mass laid down is varied by varying ejection of the foam forming stock from a nozzle.

8. The method of claim 4 wherein the mass laid down is varied by ejecting the foam forming stock from a nozzle and moving the nozzle forward and backward to the direction of conveyor movement.

9. The method of claim 4 wherein the mass laid down is varied by ejecting the foam forming stock from a nozzle and reciprocating the nozzle a Y distance with respect to the surface of the conveyor.

10. A method of making a structural foam billet of predetermined thickness having high compression strength in the Y direction comprising depositing a stream of foam forming stock onto the surface of a moving conveyor and for intermittent periods pressing a portion of the foam forming stock toward the surface of the conveyor before the foam forming stock is expanded to the predetermined thickness.

11. A method of making a structural foam billet having high compression strength in the Y direction by depositing a plurality of blobs of foam forming stock having a total mass that is large enough to form the billet when expanded, spaced from one another so that they independently expand in the Y direction before joining together into the structural foam billet.

12. The method of claim 11 in which the blobs are spaced from one another in a predetermined pattern.

13. An apparatus for making a structural foam billet having high compression strength comprising:

a moving conveyor surface, means for delivering foam forming stock to said moving conveyor surface, means for arranging foam forming stock on the conveyor surface in a plurality of separate blobs each blob having a mass of nondistinctive shape, each blob spaced from the other blobs in a predetermined order, and means for adjusting the mass of each blob so that said plurality of separate blobs expand into a structural foam billet.

* * * * *